US011869511B2

(12) United States Patent
Siyavudeen et al.

(10) Patent No.: US 11,869,511 B2
(45) Date of Patent: Jan. 9, 2024

(54) USING SPEECH MANNERISMS TO VALIDATE AN INTEGRITY OF A CONFERENCE PARTICIPANT

(71) Applicant: Cisco Technology, Inc., San Jose, CA (US)

(72) Inventors: Faisal Siyavudeen, Ernakulam (IN); Anupam Mukherjee, Bangalore (IN); Vibhor Jain, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 134 days.

(21) Appl. No.: 17/343,051

(22) Filed: Jun. 9, 2021

(65) Prior Publication Data

US 2022/0399024 A1  Dec. 15, 2022

(51) Int. Cl.
*G10L 17/04* (2013.01)
*G10L 15/18* (2013.01)
(Continued)

(52) U.S. Cl.
CPC .............. *G10L 17/04* (2013.01); *G06N 20/00* (2019.01); *G10L 15/01* (2013.01);
(Continued)

(58) Field of Classification Search
CPC ..... G10L 15/01; G10L 15/1822; G10L 15/19; G10L 15/26; G10L 17/04; G06N 20/00
See application file for complete search history.

(56) References Cited

U.S. PATENT DOCUMENTS

2013/0185057 A1*  7/2013  Yoon ...................... G09B 19/06
  704/9
2016/0337413 A1  11/2016  Sallam
(Continued)

FOREIGN PATENT DOCUMENTS

EP          2913822 A1    9/2015

OTHER PUBLICATIONS

Vineet Mehta et al., "FakeBuster: A DeepFakes Detection Tool for Video Conferencing Scenarios", arXiv:2101.03321v1 [cs.CV], Jan. 9, 2021, 5 pages.
(Continued)

*Primary Examiner* — Daniel C Washburn
*Assistant Examiner* — Paul J. Mueller
(74) *Attorney, Agent, or Firm* — Edell, Shapiro & Finnan, LLC

(57) ABSTRACT

Techniques are provided to validate a digitized audio signal that is generated by a conference participant. Reference speech features of the conference participant are obtained, either via samples provided explicitly by the participant, or collected passively via prior conferences. The speech features include one or more of word choices, filler words, common grammatical errors, idioms, common phrases, pace of speech, or other features. The reference speech features are compared to features observed in the digitized audio signal. If the reference speech features are sufficiently similar to the observed speech features, the digitized audio signal is validated and the conference participant is allowed to remain in the conference. If the validation is not successful, a variety of possible actions are taken, including alerting an administrator and/or terminating the participant's attendance in the conference.

21 Claims, 8 Drawing Sheets

(51) Int. Cl.
- *G10L 15/26* (2006.01)
- *G10L 15/01* (2013.01)
- *G06N 20/00* (2019.01)
- *G10L 15/19* (2013.01)

(52) U.S. Cl.
CPC .......... *G10L 15/1822* (2013.01); *G10L 15/19* (2013.01); *G10L 15/26* (2013.01)

(56) References Cited

U.S. PATENT DOCUMENTS

| | | | |
|---|---|---|---|
| 2016/0352708 A1* | 12/2016 | Fer | H04W 12/04 |
| 2018/0205726 A1* | 7/2018 | Chari | H04L 63/0861 |
| 2019/0214020 A1 | 7/2019 | Chen et al. | |
| 2019/0341059 A1 | 11/2019 | Moreno et al. | |
| 2020/0135226 A1 | 4/2020 | Mittal et al. | |
| 2021/0049700 A1* | 2/2021 | Nguyen | G06N 3/08 |

OTHER PUBLICATIONS

Samantha Cole, "This Open-Source Program Deepfakes You During Zoom Meetings, in Real Time," Motherboard, Tech by Vice, https://www.vice.com/en/article/g5xagy/this-open-source-program-deepfakes-you-during-zoom-meetings-in-real-time, Apr. 16, 2020, 3 pages.

Leo Kelion, "Deepfake detection tool unveiled by Microsoft," BBC, https://www.bbc.com/news/technology-53984114, Sep. 1, 2020, 4 pages.

"Detect DeepFakes: How to counteract misinformation created by AI," Mit Media Lab, https://www.media.mit.edu/projects/detect-fakes/overview/, retrieved from the Internet on Mar. 15, 2023, 5 pages.

"Deepfake Detection Challenge," Kaggle, https://www.kaggle.com/c/deepfake-detection-challenge, retrieved from the Internet on Mar. 15, 2023, 2 pages.

Shruti Agarwal, et al., "Detecting Deep-Fake Videos from Phoneme-Viseme Mismatches," Proceedings of the IEEE/ CVF conference on computer vision and pattern recognition workshops, 2020, 9 pages.

Charmaine Caparas, "Machine Learning Algorithm Uses Speech Patterns to Diagnose Depression," Futurism, https://futurism.com/machine-uses-algorithm-to-help-doctors-accurately-diagnose-depression, Jul. 19, 2016, 7 pages.

Pavel Korshunov, et al., "DeepFakes: a New Threat to Face Recognition? Assessment and Detection?," arXiv:1812.08685v1, Dec. 20, 2018, 5 pages.

Trisha Mittal, et al., "Emotions Don't Lie: An Audio-Visual Deepfake Detection Method using Affective Cues," arXiv:2003.06711v3, Aug. 1, 2020, 10 pages.

Yuezun Li, et al., "In Ictu Oculi: Exposing AI Generated Fake Face Videos by Detecting Eye Blinking," arXiv:1806.02877v2, Jun. 11, 2018, 7 pages.

Alex Drozhzhin, "How to mitigate the impact of deepfakes," Kaspersky Daily, https://usa.kaspersky.com/blog/rsa2020-deepfakes-mitigation/21133/, Mar. 12, 2020, 11 pages.

\* cited by examiner

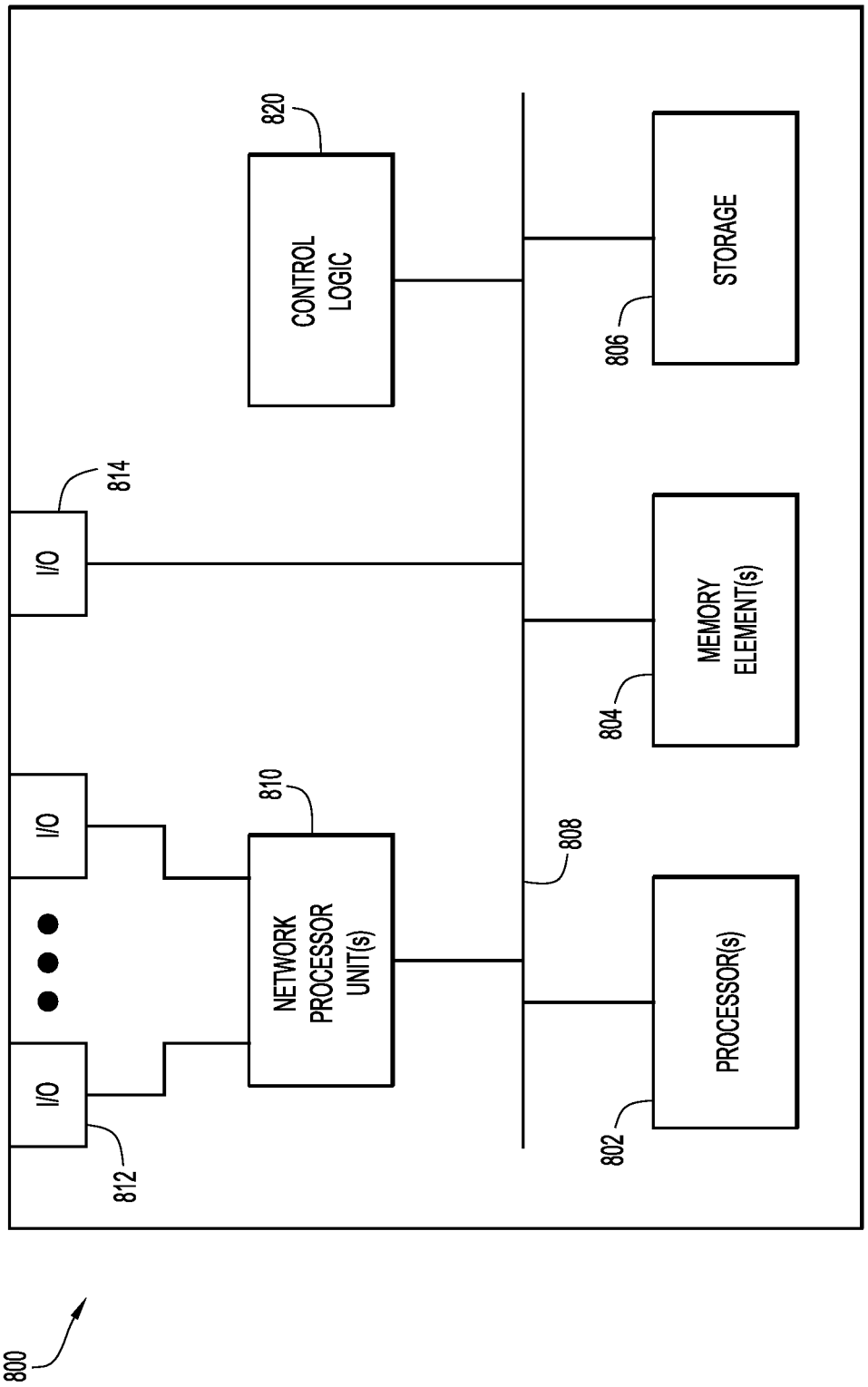

USING SPEECH MANNERISMS TO VALIDATE AN INTEGRITY OF A CONFERENCE PARTICIPANT

TECHNICAL FIELD

The present disclosure relates to validating audio signals provided by participants in a conferencing session.

BACKGROUND

Malicious tools are becoming publically available that provide for injection of deep fake content in virtual meetings, such as video conferences or even audio only virtual meetings, as well as other video content. With deep-fake quality continuously improving, it may soon become difficult for participants in a meeting to readily identify when one of the participants is a deep fake version of an otherwise known or valid participant.

BRIEF DESCRIPTION OF THE DRAWINGS

FIG. 8 is a hardware block diagram of a computer system configured to perform the techniques presented herein, in accordance with an example embodiment.

DESCRIPTION OF EXAMPLE EMBODIMENTS

Overview

Figure 1:
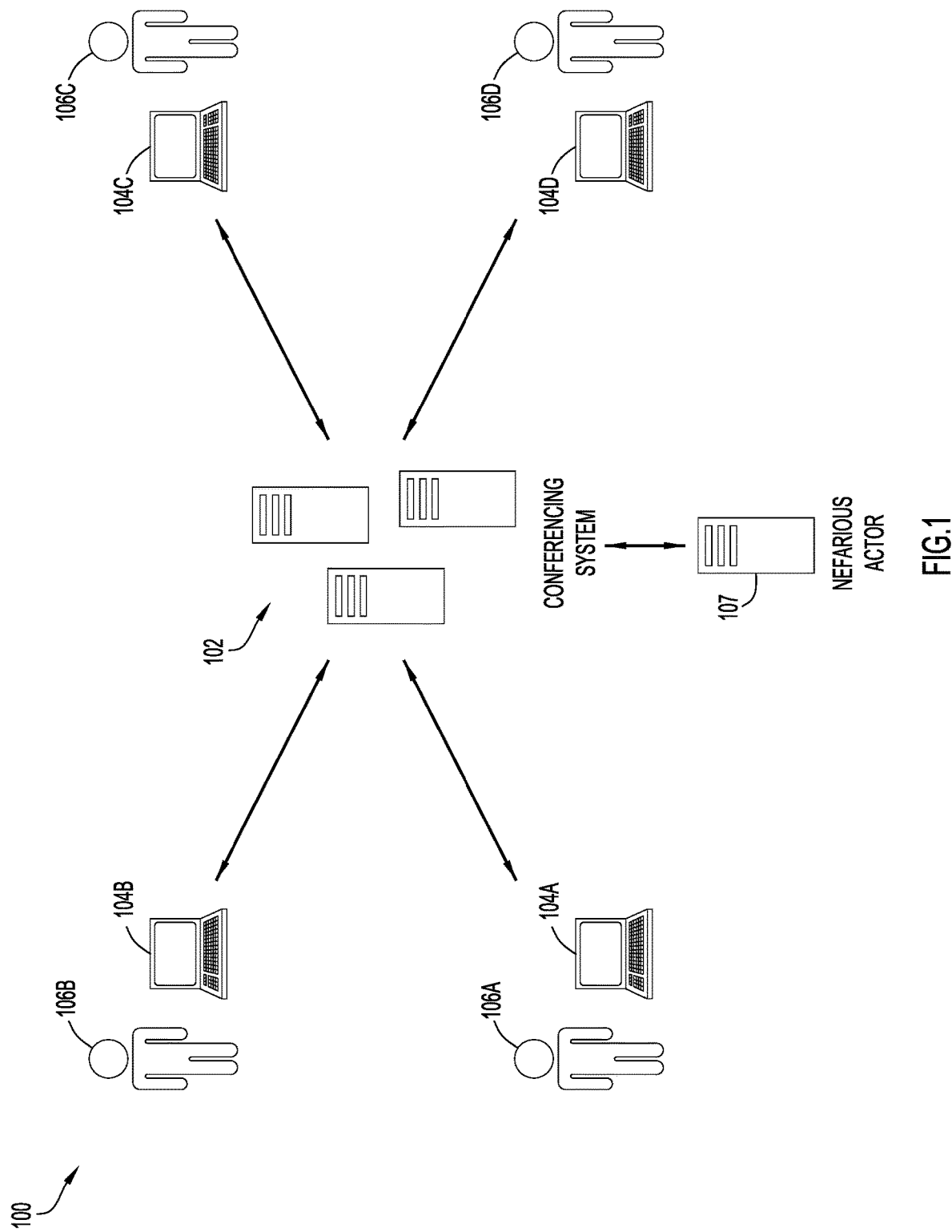
FIG. 1 is an overview diagram of a conferencing system in which the techniques presented may be employed, in accordance with an example embodiment.

Presented herein are techniques to analyze speech mannerisms of a person to verify whether that audio of that person is actually real audio spoken by that person. These techniques may be employed in a conference session, as an example. Accordingly a method is provided that includes establishing a conference session with a plurality of participant user devices. The method includes receiving a digitized audio signal from a participant user device of the plurality of participant user devices, and establishing a user account identity associated with the participant user device. The method further includes determining reference speech mannerism features associated with the user account identity, and converting the digitized audio signal to text. The method further includes generating, based on the text, observed speech mannerism features that are exhibited by the digitized audio signal, determining a similarity measure between the reference speech mannerism features and the observed speech mannerism features, validating an integrity of the digitized audio signal based on the similarity measure, and selectively maintaining the participant user device in the conference session based on the validation.

Example Embodiments

The embodiments disclosed herein are generally directed to analysis of an audio signal. The analysis characterizes speech included in the audio signal. In some embodiments, the audio signal is converted into a text form, which provides for parsing of the text for relevant linguistic features, such as word choices, pauses, idioms, grammatical errors, and other linguistic features that provide a distinctiveness and thus a feature of an individual's speech. An audio signal asserted to be generated by the individual is then validated to determine whether the audio signal is in fact generated by the individual.

In some embodiments, these methods are applied to remote communication sessions that facilitate the exchange of information between multiple individuals, such as video conferences or the older method of teleconferences. These methods can also be applied in conversations that occur between just two individuals, such as in a phone call. The increasing prevalence of "deep fake" technology, and the further emergence of nefarious tools to make it easier for the public to apply the technology are increasing the importance of improved validation that conference participants are who they assert to be.

Some embodiments train a speech mannerism model by collecting examples of speech of a reasonable length on various topics from individuals the system is configured to validate. In some cases, video produced by a user account that is authenticated to confirm the individual's identity is also used to train the model. Some embodiments utilize keys derived from short-lived identity tokens to authenticate the individuals. Some embodiments extract meeting transcripts of previously held meetings to assist with training the models. For example, many enterprise video conferencing systems provide application programming interfaces that provide for extraction of meeting transcripts.

The speech data is then provided to a natural language processing (NLP) model (e.g., some embodiments utilize a recurrent neural network (RNN), a long short-term memory (LSTM)/Bi-directional LSTM model or a transformer kind of artificial neutral network (ANN) architecture internally. Some embodiments of the model use a stochastic classifier which identifies a user based on speech mannerism features identified in an audio signal received from a video conference participant. In some embodiments, a user is identified based on a similarity score that evaluates multiple dimensions or features of speech mannerisms extracted from the audio signal.

One challenge with implementing a speech mannerism model as described above is the volume of training data necessary to provide an accurate model is, in some cases, extensive. Due to complexity of the model, maintaining adequate performance can also be a challenge. To solve these problems, manifold learning is employed in some embodiments. The data is segmented into distinct features in some embodiments, a multiple feature specific, and thus smaller and less complex, classifiers are used to classify the multiple dimensions or features of the audio signal.

In some embodiments, the model is configured to learn characteristics of a plurality of speech mannerism features, both syntactic and semantic in nature. These features include typical pauses, grammatical errors, use of idioms and phrases, filler words, choice of words and their sequences, commonly used set of words or other audio artifacts. This results in a model that can distinguish between an authentic user and one that might be an imposter, for example, a user that is being imitated via "deep fake" technology.

In some embodiments, an adversarial network using noise filtration suppresses typical background noises and/or codec/network artifacts that do not contribute to a speech mannerism feature. Reduction of noise can also assist the model in identifying individuals by avoiding overfitting.

Some embodiments utilize a second ANN model that operates in parallel with the NLP based model. Use of two models to detect an identity of an individual can increase a confidence level of the detection. In some embodiments, inputs to the ANN model and NLP model may overlap, but may also rely on some number of different inputs.

Some embodiments also perform facial recognition of a video conference participant by comparing the video image to a profile photograph associated with a user account. Some embodiments analyze a facial image obtained from a video conference image to profile images available in an enterprise wide directory service. This allows the model to identify users within a larger organization.

While supporting guest access to video conferences can present specific security concerns, some embodiments of the disclosed video conferencing system generate prompts to a video conference host requesting the host to explicitly validate a guest user's access. For example, the host may rely on their own personal knowledge to validate the identity of a guest user. The guest host then provides input, via a user interface to the video conferencing system, indicating whether the guest user is validated or not.

Thus, while it is possible for an accomplished actor to impersonate a style of speech of a targeted individual, providing this level of impersonation at scale is difficult or impossible. While automated techniques can allow a nefarious actor to generate speech from text that is typed in real-time to match a targeted individuals speaking style, this adds an additional layer of complexity and sophistication that is then needed to successfully impersonate an individual in the presence of the disclosed embodiments. Impersonation is further complicated as most deep fakes are implemented using a generative adversarial network (GAN), which does not integrate well with ad-hoc human based methods described above. Furthermore, the disclosed embodiments can be integrated with other existing deep fake detection tools to further mitigate most deep fake injection attacks.

FIG. 1 is a high-level system diagram of a conferencing environment 100 in which deep fake related techniques may be employed, in accordance with an example embodiment. FIG. 1 shows a conferencing system 102 that is in communication with a plurality of participant user devices, shown as participant user device 104A, participant user device 104B, participant user device 104C, and participant user device 104D. Each participant user device 104A-D is shown being associated with a respective user, user 106A, user 106B, user 106C, and user 106D. Also shown attending the conference in FIG. 1 is a nefarious actor device 107. The nefarious actor device 107 attempts to impersonate a valid participant user device. For example, the nefarious actor device 107, in some embodiments, obtains compromised authentication credentials and is able to successfully authenticate into a conference session with an identity of an otherwise valid user. Thus, the nefarious actor device 107 is effectively also a participant user device of the conference.

While each of the participant user devices 104A-D are shown to include a display, some embodiments of the conferencing system 102 are an audio conferencing system and do not necessarily provide video-based conferencing. The conferencing system 102 may include one or more server computers configured to support a conference session among the participant user devices 104A-D.

In some circumstances, the nefarious actor utilizes techniques to simulate, spoof, or otherwise impersonate an individual or user that would otherwise be authorized to attend the conference. For example, in some cases, authentication credentials of an authorized user become compromised, allowing the nefarious actor to successfully log in to the conference. By simulating the authorized user, the nefarious actor may be able to obtain confidential or otherwise sensitive information shared during the conference. In some cases, the nefarious actor utilizes "deep fake" technology to at least assist in their simulation of the authorized user. Deep fake technology generally includes utilization of a machine learning model to replace features or characteristics of a nefarious user with features or characteristics of the authorized user. The replaced features can include audio features. For example, a tone of the nefarious users' voice is modified to more closely model a tone of the authorized users' voice. In video conferences, facial features of the nefarious user are replaced with facial features of the authorized user. Technology to implement such a simulation has become so advanced that, in some cases, other conference participants perceive that the authorized user is attending the conference, and do not suspect that any nefarious actor is involved. This lack of awareness leads the conference participants to share information during the conference that would not be shared in a context that included a user outside the authorized user group.

In accordance with the embodiments presented herein, the conferencing system 202 (one or more servers of the conferencing system 202) is configured to perform operations to analyze the speech mannerisms of a conference participants in order to determine whether the audio from a participant is inauthentic or a deep fake. One of the consequences of determining that the audio is a deep fake may be that a participant is removed from a conference session.

Figure 2:
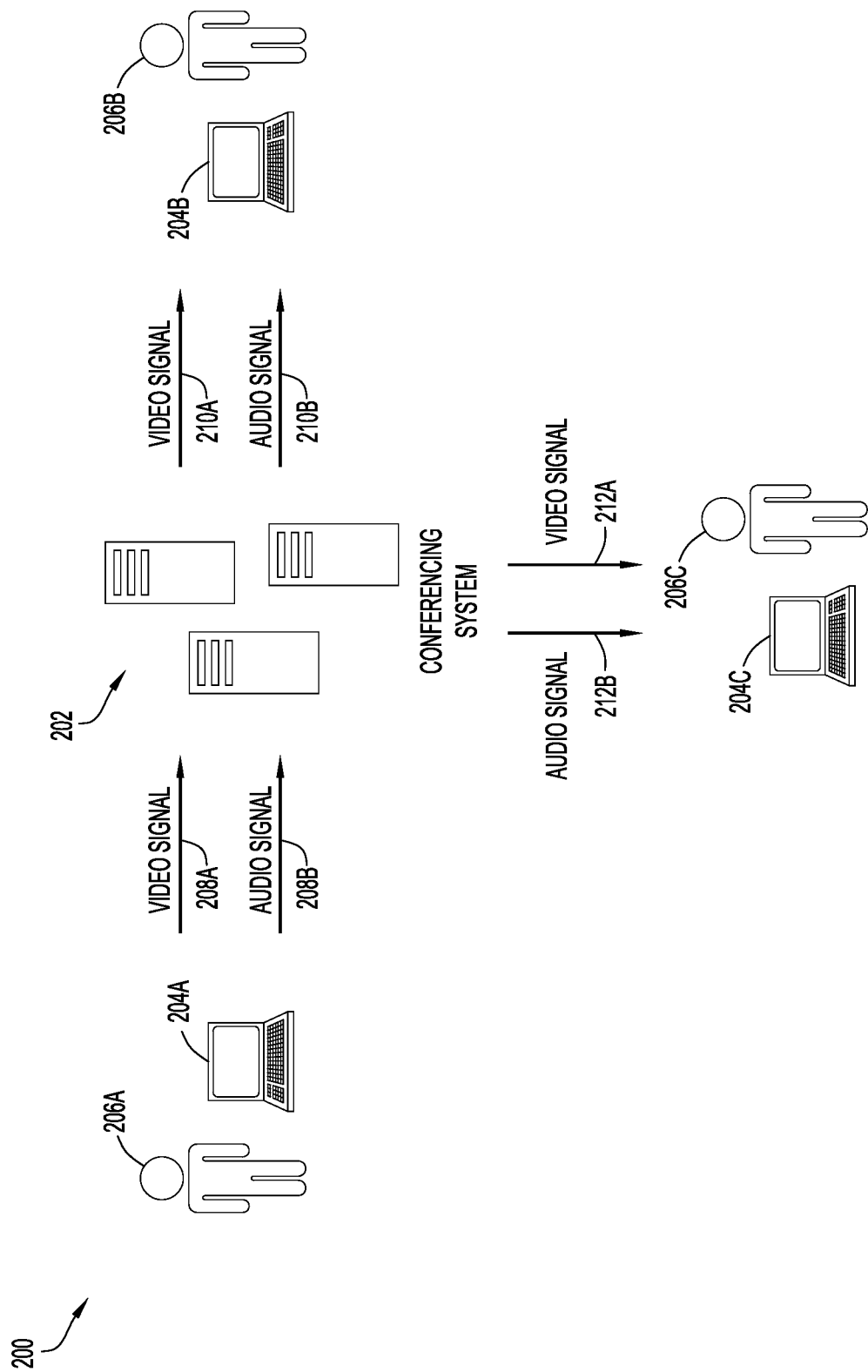
FIG. 2 illustrates an operational flow between conference participant user devices and a conferencing system that is configured to validate the authenticity of an audio signal from one of the participant user devices, according to an example embodiment.

FIG. 2 illustrates an operational flow 200 among three conference participant user devices 204A, 204B and 204C and a conferencing system 202. FIG. 2 shows that a participant user device 204A is attended by a participant 206A, participant user device 204B is attended by participant 206B and participant user device 204C is attended by participant 206C. The participant user device 204A generates a video signal 208A and an audio signal 208B. The video signal 208A and audio signal 208B are received by the conferencing system 202. The conferencing system 202 maintains a list of participant user devices participating in the conference. For example, in some embodiments, each of the participant user devices 204A-C establishes a session with the conferencing system 202, and participates in a conference session. Within the conference session, video and/or audio received from the first participant user device 204A is received by the conferencing system 202 and forwarded to each of the other devices participating in the conferencing session. Thus, in the example conference session of FIG. 2, upon receiving the video signal 208A and audio signal 208B from the first participant user device 204A, the conferencing system 202 forwards the video signal 208A and audio signal 208B to the participant user device 204B, shown as forwarded video signal 210A and forwarded audio signal 210B. The participant user device 204B then outputs these signals to be perceived by a participant 206B. Similarly, as the participant user device 204C is also participating in the conferencing session, the conferencing system 202 also forwards the video signal 208A to the participant user device 204C as video signal 212A. The participant user device 204C outputs these signals to the participant 206C. The conferencing system 202 forwards the audio signal 208B to the participant user device 204C as audio signal 212B. In some cases, the conferencing system 202 multiplexes multiple signals from multiple different user participant devices and delivers the multiplexed signal to another participant user device.

According to the techniques presented herein, the conferencing system 202 is configured to analyze the audio signal 208B of participant 206A in order to determine whether the audio signal 208B may be impersonated or a deep fake. If the conferencing system 202 determines that the audio signal 208B does not correlate with audio of the real participant A, the conferencing system 202 can take appropriate actions, as described herein.

Figure 3:
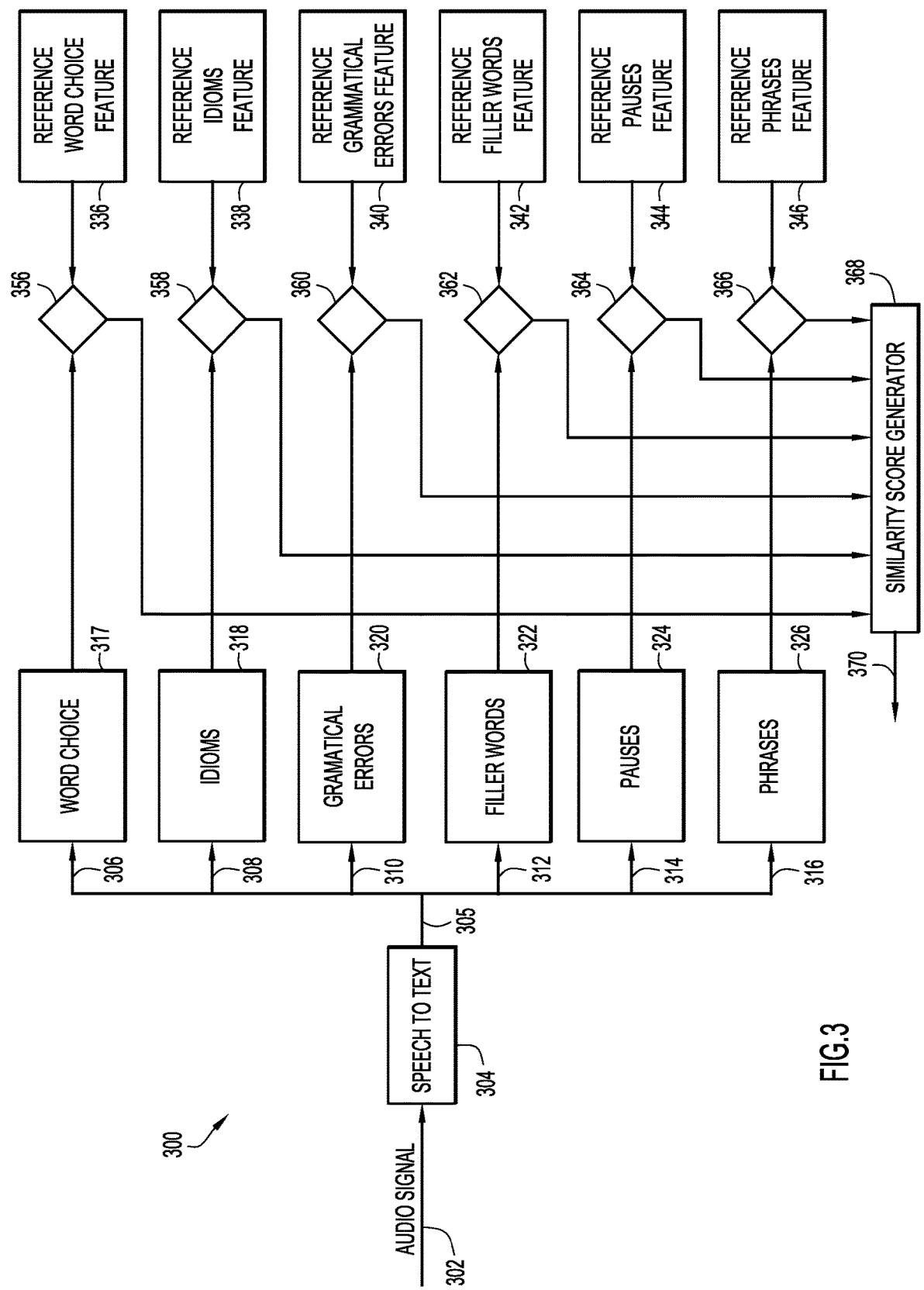
FIG. 3 illustrates a process for computing a similarity measurement of an audio signal according to an example embodiment.

FIG. 3 illustrates a process 300 for computing a similarity measurement of an audio signal, according to an example embodiment. FIG. 3 shows an audio signal 302 being provided to an audio-to-text (also called speech-to-text (STT)) operation 304. In some embodiments, the audio-to-text operation 304 implements natural language processing techniques. In some embodiments, the audio-to-text operation 304 includes a machine learning model trained to recognize words in an audio signal and convert those words into text form.

The audio-to-text operation 304 generates text data 305. The text data 305 is provided to each of a word choice classifier 306, idiom classifier 308, grammatical errors classifier 310, filler words classifier 312, pauses classifier 314, and phrases classifier 316. The word choice classifier 306 develops an observed word choice feature 317 present in the text data 305. The observed word choice feature 317 may take on a variety of forms. In one embodiment, the observed word choice feature 317 includes a list of words and their absolute or relative frequency in the text data 305 (and thus the audio signal 302). For example, in some embodiments, the observed word choice feature 317 includes an ordered list of words, with the words ordered by their frequency of occurrence. The idiom classifier 308 analyzes the text data 305 to determine an observed idiom feature 318 of the text data 305. As described above with respect to the observed word choice feature 317, in some embodiments, an observed idiom feature 318 includes a list of idioms present in the text data 305 and their absolute (e.g. per time unit of speech) and/or relative frequency. The grammatical errors classifier 310 analyzes the text data 305 and generates an observed grammatical errors feature 320 present in the text data 305. For example, the grammatical errors classifier 310 generates, in some embodiments, an observed grammatical errors feature 320 indicating types of grammatical errors present in the text data 305 and their absolute (e.g. per time unit of speech) and/or their relative frequency. The filler words classifier 312 analyzes the text data 305 and generates an observed filler words feature 322 of the text data 305. The observed filler words feature 322 defines, in some embodiments, filler words present in the text data 305 and their absolute or relative frequency. The pauses classifier 314 similarly analyzes the text data 305 and develops an observed pauses feature 324 indicating a length of pauses present in the speech and their relative frequency. Some embodiments of a pause feature indicate different frequencies for pauses of differing lengths. The phrases classifier 316 analyzes the text data 305 and develops an observed phrases feature 326 present in the text data 305. In some embodiments, the observed phrases feature 326 identifies phrases present and their absolute or relative frequency in the text data 305. Each of the observed word choice feature 317, observed idiom feature 318, observed grammatical errors feature 320, observed filler words feature 322, observed pauses feature 324, and observed phrases feature 326 are compared to corresponding features, such as the reference word choice feature 336, reference idioms feature 338, reference grammatical errors feature 340, reference filler words feature 342, reference pauses feature 344, and reference phrases feature 346 respectively.

Each of the reference word choice feature 336, reference idioms feature 338, reference grammatical errors feature 340, reference filler words feature 342, reference pauses feature 344, and reference phrases feature 346 are developed via text based processing of audio signals known to have been generated by a particular individual. FIG. 3 illustrates that these reference features are compared to their corresponding observed features via comparison operations 356, 358, 360, 362, 364, and 366, respectively, to determine a respective difference between the observed and reference features for each dimension of speech represented by the features. These multi-dimensional differences are then aggregated and further analyzed by a similarity score generator operation 368. The similarity score generator operation 368 generates a similarity indication 370 (e.g. a score) that represents an overall measurement of similarity between speech observed in the audio signal 302 and the reference speech information provided by the reference features. In some embodiments, each of the reference speech information is associated with a known user identity, and is then consulted when some of the disclosed embodiments verify an authenticity of an identity of a participant in a conference.

Figure 4:
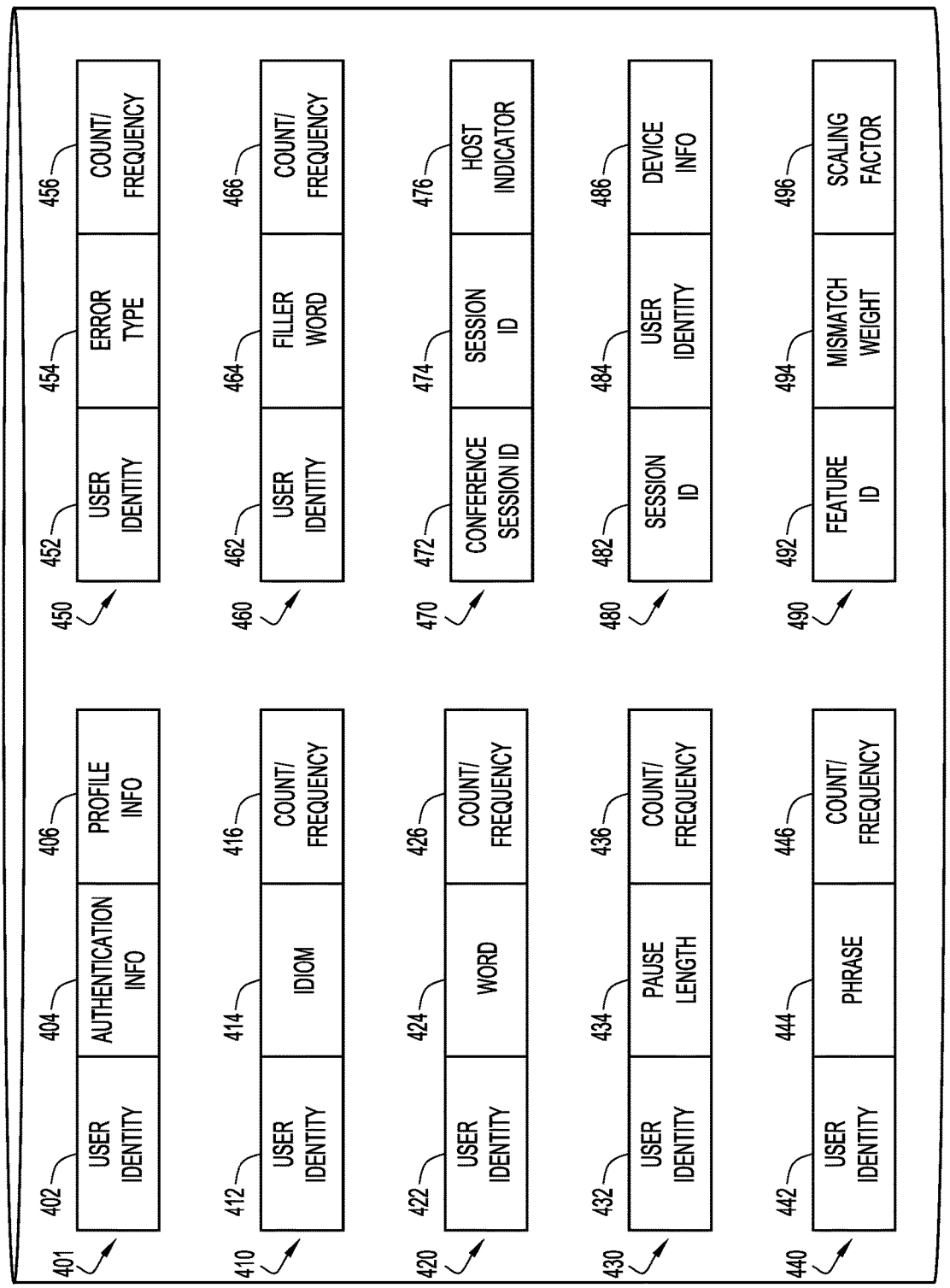
FIG. 4 shows example data structures implemented in an example embodiment.

FIG. 4 shows an example data store 400 that may be used in accordance with the techniques presented herein, in an example embodiment. While the example data store 400 includes data structures that are discussed as relational database tables, the disclosed embodiments are not limited to these examples. Some embodiments utilize linked lists, arrays, unstructured data stores or other types of data architectures, and the examples of FIG. 4 are provided only to illustrate data maintained and processed by an example embodiment.

FIG. 4 illustrates a user identity table 401, idiom feature table 410, word choice feature table 420, pause feature table 430, phrase feature table 440, grammatical error feature table 450, filler word feature table 460, conference session table 470, a session information table 480, and a feature weight table 490. The user identity table 401 stores information associated with a particular user account of a conferencing system. The user identity table 401 includes a user identity field 402, authentication information field 404, and profile information field 406. The user identity field 402 stores an identifier that is unique for each user account of a conferencing system (e.g. any of the conferencing systems 102 or 202). The authentication information field 404 stores authentication credentials to validate an identity of the user. This can include, in various embodiments, one or more of an account name, account password, secondary authentication method information (e.g. phone numbers, email address, etc.). The profile information field 406 includes additional information about a particular user, such as, one or more of user preference information, profile photos, background choices, or other information. Each of the idiom feature table 410, word choice feature table 420, pause feature table 430, phrase feature table 440, grammatical error feature table 450, and filler word feature table 460 stores reference features for one or more user identifies of users of a conferencing system. Thus, some of the disclosed embodiments develop and/or store reference speech feature information that is compared against feature information collected from an audio signal generated by a participant in a conference. These embodiments then compare the observed features against the reference feature information to validate that a participant in a conference is or is not the user they assert to be.

The idiom feature table 410 includes a user identity field 412, idiom field 414, and a count/frequency field 416. The user identity field 412 identifies a user associated with the feature (defined by the row of the idiom feature table 410). The idiom field 414 identifies a particular idiom. Some embodiments identify an idiom via storage of text of the idiom (e.g. "raining cats and dogs") in the idiom field 414. Other embodiments associate predefined integer values with each idiom and store the predefined integer value in the idiom field 414. The count/frequency field 416 defines a count and/or a frequency of occurrences of the defined idiom. Some embodiments store both an ongoing count and a frequency so that the frequency can be updated as new examples of speech are processed and added to the reference feature information. In some embodiments, frequency information is stored as a relative frequency and/or an absolute frequency. For example, some embodiments implement frequency information that effectively orders words by a frequency of their use. Some embodiments indicate how frequently a particular word is used per unit of time. Some embodiments implement one or both of this type of frequency information. This applies to each of the count/frequency fields discussed with respect to FIG. 4.

The word choice feature table 420 includes a user identity field 422, word field 424, and a count/frequency field 426. The user identity field 422 identifies a user associated with the feature (defined by the row of the word choice feature table 420). The word field 424 identifies a particular word. The count/frequency field 426 identifies a number of instances and/or a frequency of the word defined by the word field 424, and includes, in various embodiments, information analogous to any of the variations discussed above with respect to the count/frequency field 416.

The pause feature table 430 includes a user identity field 432, pause length field 434, and a count/frequency field 436. The user identity field 432 identifies a user associated with the feature (defined by the row of the pause feature table 430). The pause length field 434 identifies a length of a particular pause included in a feature. The count/frequency field 436 identifies a number of instances and/or a frequency of pauses of the identified length defined by the pause length field 434, and includes, in various embodiments, information analogous to any of the variations discussed above with respect to the count/frequency field 416.

The phrase feature table 440 includes a user identity field 442, phrase field 444, and a count/frequency field 446. The user identity field 432 identifies a user associated with the feature (defined by the row of the phrase feature table 440). The phrase field 444 stores a phrase represented by the feature. The count/frequency field 446 identifies a number of instances and/or a frequency of the identified phrase of the phrase field 444, and includes, in various embodiments, information analogous to any of the variations discussed above with respect to the count/frequency field 416.

The grammatical error feature table 450 includes a user identity field 452, error type field 454, and a count/frequency field 456. The user identity field 452 identifies a user associated with the feature (defined by the row of the grammatical error feature table 450). The error type field 454 identifies a type of grammatical error included in or represented by the feature. The count/frequency field 456 identifies a number of instances and/or a frequency of the identified grammatical error of the error type field 454, and includes, in various embodiments, information analogous to any of the variations discussed above with respect to the count/frequency field 416.

The filler word feature table 460 includes a user identity field 462, filler word field 464, and a count/frequency field 466. The user identity field 462 identifies a user associated with the feature (defined by the row of the filler word feature table 460). The filler word field 464 identifies a filler word included in or represented by the feature. The count/frequency field 466 identifies a number of instances and/or a frequency of the identified filler word (of the filler word field 464), and includes, in various embodiments, information analogous to any of the variations discussed above with respect to the count/frequency field 416.

The conference session table 470 includes a conference session identifier field 472, a session identifier field 474, and a host indicator field 476. The conference session identifier field 472 stores an identifier that uniquely identifies a conference session that includes one or more participant user devices. Thus, a first group of participant user devices in communication with each other (e.g. via the conferencing system 102 or conferencing system 202) are identified via a first conference session identifier, while a second group of participant user devices in communication with each other are identified via a second conference session identifier. The session identifier field 474 uniquely identifies a particular session between a single participant user device and a conferencing system. Thus, for a single conference session (e.g., identified via the conference session identifier field 472), there can be zero or more session identifiers (each identifying a participant user device connected in the conference). The host indicator field 476 indicates whether the identified session is a host of the video conference session (identified by the conference session identifier field 472).

The session information table 480 includes a session identifier field 482, user identity field 484, and a device information field 486. The session identifier field 482 uniquely identifies a session between a conferencing system (e.g. conferencing system 102 or conferencing system 202) and a participant user device. The session identifier field 482 can be cross referenced with the session identifier field 474. The user identity field 484 identifies a user identity associated with a particular session. Thus, which users are participating in which conferences is identifiable via the user identity field 484, in combination with the conference session table 470. The device information field 486 stores information regarding a device to which the session (of session identifier field 482) is established. Thus, for example, the device information field 486 stores, in some embodiments, one or more of IP address, destination port number, input or output stream identifiers, or other information to assist a conferencing system in communicating with a participant user device.

The feature weight table 490 includes a feature identifier field 492, a mismatched weight field 494, and a scaling factor field 496. The feature identifier field 492 identifies a particular feature. For example, the feature identifier field 492 identifies, in some embodiments, a particular pause length, a particular word, a particular idiom, a particular filler word, a particular phrase, a particular type of grammatical error, or other speech feature analyzed by one or more of the disclosed embodiments. The mismatched weight field 494 identifies a weight added to a similarity measure when the identified feature is present in one of an observed feature set or a reference feature set (but not both). The scaling factor field 496 defines a scaling factor for the identified feature. The scaling factor is used, in some embodiments, to determine a weight added to a similarity measure when frequencies of observed feature differs from a frequency of the same reference feature.

Figure 5:
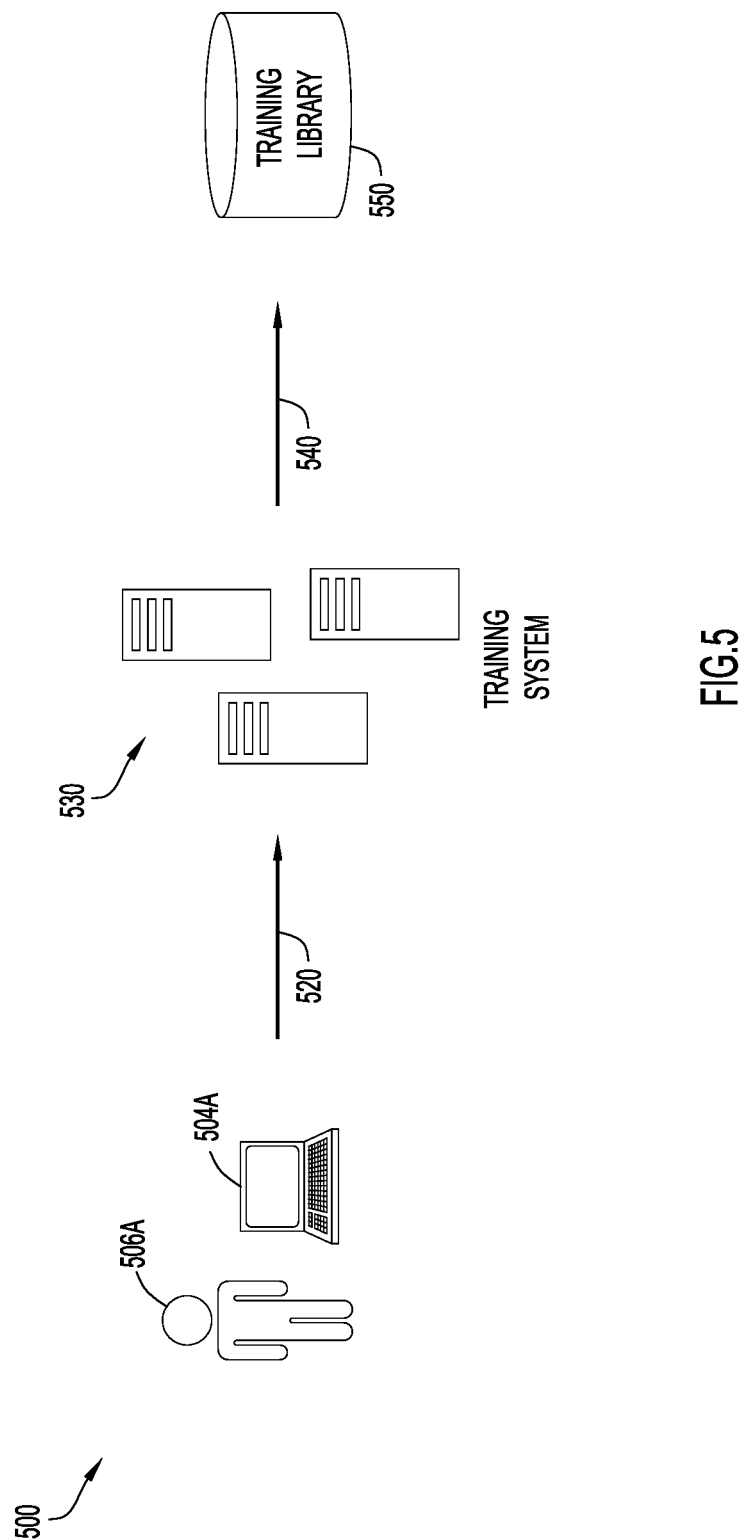
FIG. 5 illustrates a speech feature training process according to an example embodiment.

FIG. 5 illustrates a speech feature training process according to an example embodiment. As discussed above, some of the disclosed embodiments compare one or more speech features obtained from an observed audio signal to reference feature information generated from speech of an individual with a known identity. This reference feature information may be generated under a variety of conditions. Some embodiments generate reference feature information while hosting a conference that includes the participant. Reference feature information generated under such conditions is based on the assumption that a substantial majority of feature information taken in this manner are collected from the true or "real" user. Collecting reference feature information in this manner is also at least partially justified because the feature information benefits from a relatively larger amount of speech samples than would be available if a dedicated speech model training procedure were used. Such procedures require conference participants to reserve time exclusively for providing speech samples to train the speech models. While this can greatly improve the accuracy and robustness of the resulting reference feature information, the burden imposed on participants is considered, at least under some circumstances, to be at a level that will dissuade at least some participants from completing an amount of training sufficient to train the model. Thus, some embodiments are designed to collect reference feature information from conferences that include the participant as it is perhaps the best method available to collect reference feature information at scale.

In the training process 500 of FIG. 5, a participant user device 504A provides audio samples 520 to a training system 530. In some embodiments, the training system 530 also functions as a conferencing system, such as the conferencing system 102 and/or 202 discussed above. The training system 530 generates, based on audio samples 520, reference feature information 540 and stores the reference feature information 540 in a training library 550. In some embodiments, the training library 550 stores one or more of the table discussed above with respect to FIG. 4, and specifically, any one or more of the idiom feature table 410, word choice feature table 420, pause feature table 430, phrase feature table 440, grammatical error feature table 450, or the filler word feature table 460. Furthermore, any one or more of the reference word choice feature 336, reference idioms feature 338, reference grammatical errors feature 340, reference filler words feature 342, reference pauses feature 344, or reference phrases feature 346 are read from the training library 550, in some embodiments.

In some embodiments, the training system 530 generates one or more prompts and outputs the one or more prompts to the participant user device 504A. The user 506A then responds verbally to the one or more prompts, with the verbal responses being encoded in the audio samples 520 and used to generate reference feature information for the training library 550.

Figure 6:
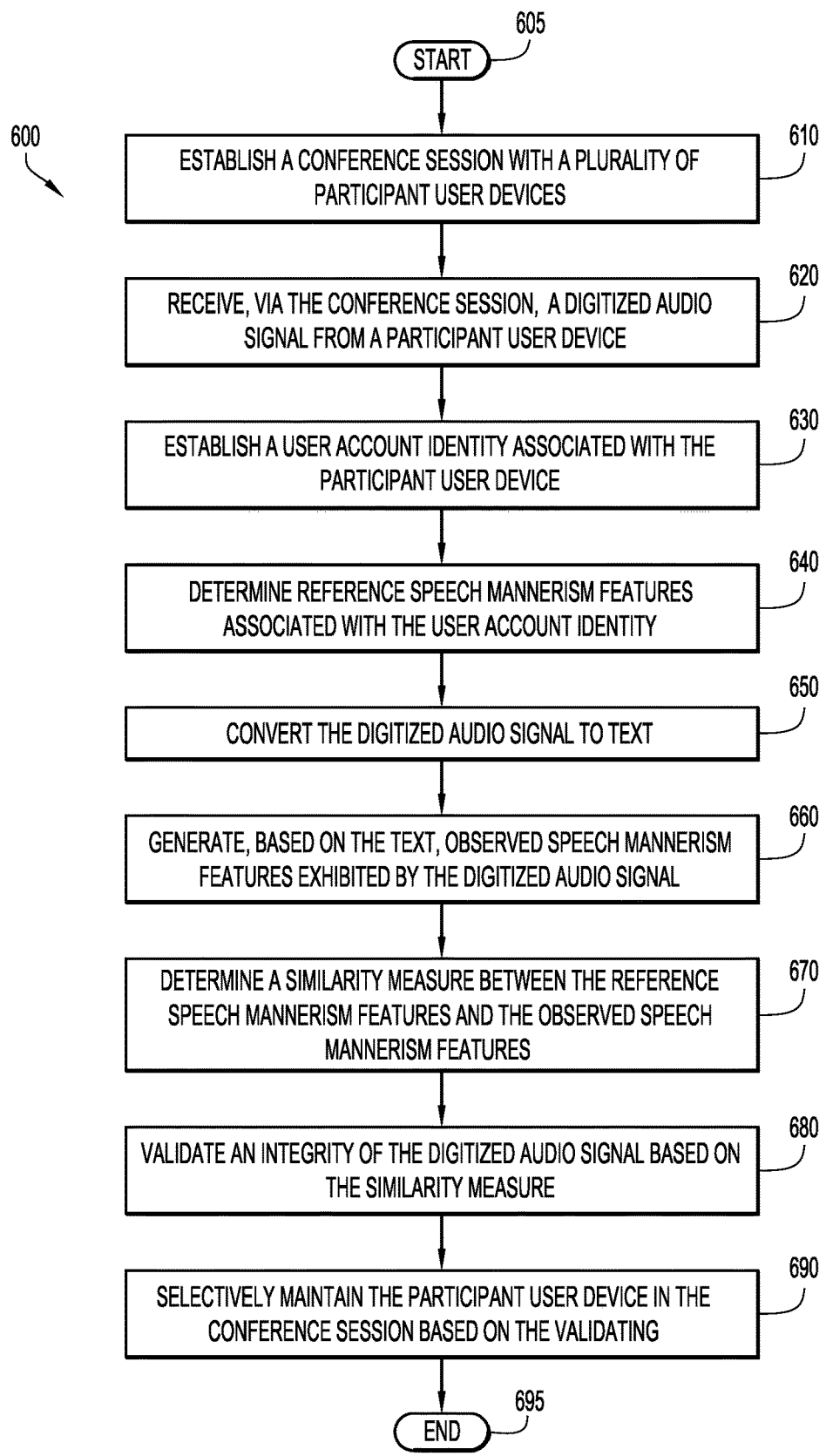
FIG. 6 is a flowchart of a method of validating a conference participant in accordance with an example embodiment.

FIG. 6 is a flowchart of a method 600 of validating a conference participant in accordance with an example embodiment. In some embodiments, one or more of the functions discussed below with respect to the method 600 and/or FIG. 6 is performed by hardware processing circuitry. For example, in some embodiments, instructions stored in memory element(s) 804, discussed below with respect to FIG. 8, configure processor(s) 802 to perform one or more of the functions discussed below with respect to FIG. 6. In some embodiments, method 600 is performed by a conferencing system, such as any of the conferencing systems 102 or 202 discussed above with respect to FIGS. 1 and/or 2. Reference is also made to FIGS. 1-5 in connection with the description of FIG. 6.

After start operation 605, method 600 moves to operation 610. In operation 610, a conference session is established with a plurality of participant user devices.

In operation 620, a digitized audio signal is received from a participant user device. The digitized audio signal is received via the conference session. For example, in some embodiments, the digitized audio signal is received from a participant user device.

In operation 630, an identifier of a user account associated with a participant user device is established. For example, in some embodiments of operation 630, authentication credentials are provided by a participant user device. A conferencing system compares the supplied authentication credentials to a credentials data store (e.g. analogous to the user identity table 401 and/or the authentication information field 404). When the credentials match a configured user, the identity is established. Some embodiments of operation 630 include opening a session with the participant user device (e.g., populating a data structure analogous to the conference session table 470 and/or the session information table 480), with the session identifying the participant user device with which the session is shared (e.g., via a field analogous to the device information field 486).

In operation 640, reference speech mannerism features associated with the determined user account identity are determined. For example, in some embodiments, a user identity is determined based on the authentication and session process described above. Based on the user identity, one or more speech features are determined (e.g., by searching one or more data structures analogous to the idiom feature table 410, word choice feature table 420, pause feature table 430, phrase feature table 440, grammatical error feature table 450, or the filler word feature table 460 based on the user identity determined in operation 630. In other words, operation 640 identifies one or more features representing audio that is previously known to have been generated by an individual corresponding to the determined user account identity of operation 630.

In operation 650, the digitized audio signal is converted to text. As discussed above, some embodiments use natural language processing, and/or a machine learning model (e.g., a neural network) to convert the digitized audio signal to text.

In operation 660, observed speech mannerism features that are exhibited by the text are generated. For example, as discussed above with respect to FIG. 3, some embodiments employ one or more classifiers to extract features from the text version of the digitized audio signal. Each classifier is configured to identify characteristics of one or more dimensions of speech included in the digitized audio signal. In some embodiments, operation 660 utilizes a stochastic classifier to identify the characteristics, features, or feature of one or more dimensions of the speech. As discussed above with respect to FIG. 4, some embodiments determine a count and/or a frequency of occurrence of various features of speech, such as pauses, particular word choices, idioms, grammatical errors, fill words, phrases, or other speech characteristics.

In operation 670, a similarity measurement is determined based on the reference speech mannerism features and the observed speech mannerism features. For example, as discussed above with respect to FIG. 3, some embodiments implement a similarity score generator that compares reference features to observed features of the speech encoded in the digitized audio signal. Results of each comparison are aggregated to determine an overall measure of similarity between the observed search and reference features of speech of an individual associated with the user account identity established by operation 630. One example of a similarity measurement is described below in connection with FIG. 7.

In operation 680, an integrity of the digitized audio signal is validated based on the similarity measure. Some embodiments evaluate one or more criteria with respect to the similarity measurement. For example, some embodiments compare the similarity measurement determined in operation 680 to a predefined threshold, with a relation between the similarity measurement and the threshold determining whether the integrity of the digitized audio signal is validated or not (e.g. if the similarity measurement is below (or above depending on implementation specifics) the predefined threshold, the integrity is validated, otherwise the integrity is not validated.

In operation 690, the participant user device is selectively maintained in the conference session based on the validation. In some embodiments, if the integrity of the digitized audio signal cannot be validated by operation 680, operation 690 disconnects the participant user device from the video conference. In other embodiments, operation 690 generates an alert based on the failure to validate. In some embodiments, the alert displays a message to a user designated as a host or administrator of the video conference. If the participant user device is the device of the host or administrator of the video conference, some embodiments notify an administrator of the conferencing system itself (e.g. an administrator designated for the conferencing system 102 or conferencing system 202).

After operation 690 completes, method 600 moves to end operation 695.

Figure 7:
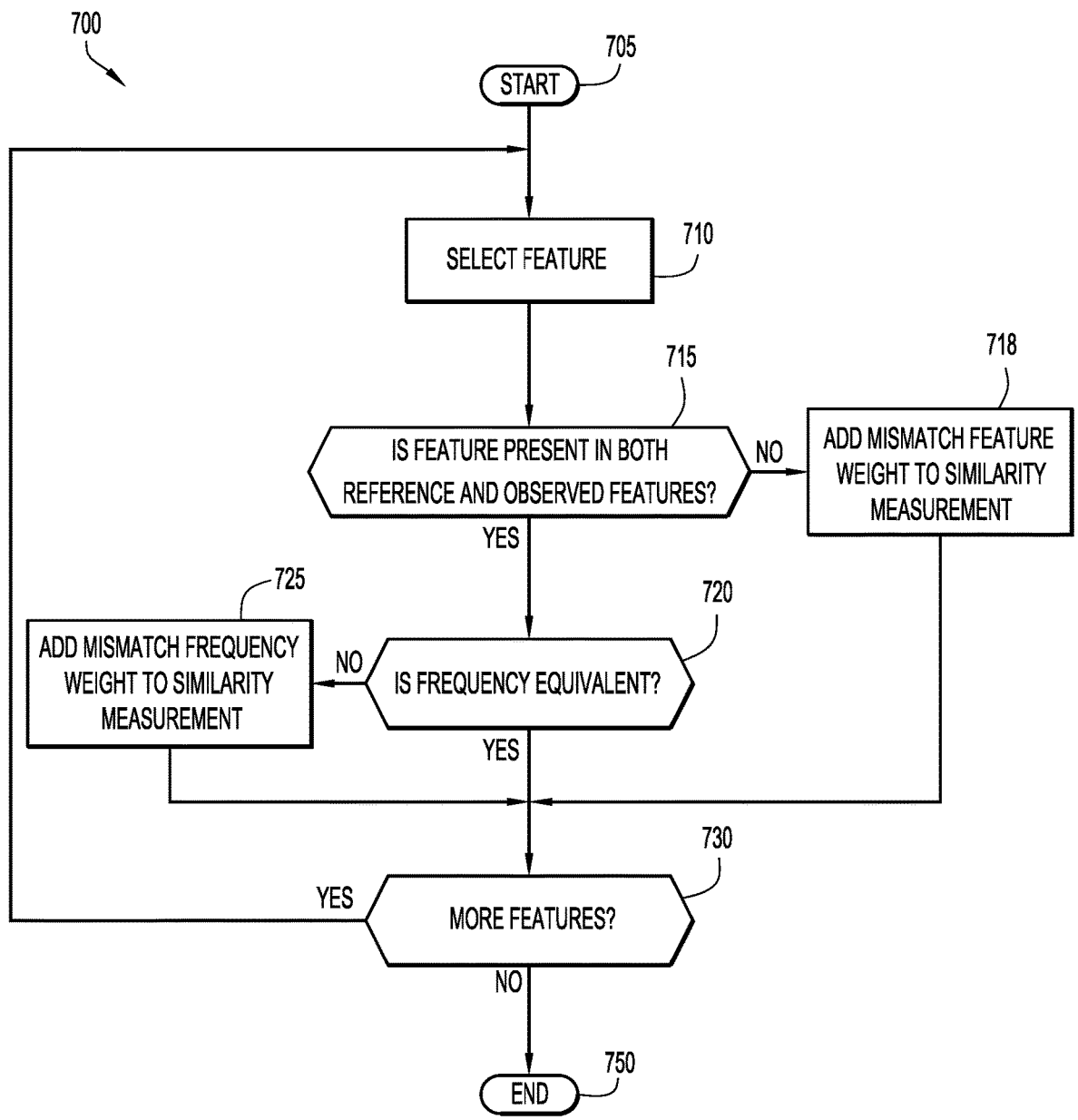
FIG. 7 is a flowchart of a method of determining a similarity measurement in accordance with an example embodiment.

FIG. 7 is a flowchart of a method of determining a similarity measurement in accordance with an example embodiment. In some embodiments, one or more of the functions discussed below with respect to the method 700 and/or FIG. 7 is performed by hardware processing circuitry. For example, in some embodiments, instructions stored in memory element(s) 804, discussed below with respect to FIG. 8, configure processor(s) 802 to perform one or more of the functions discussed below with respect to FIG. 7. In some embodiments, method 700 is performed by a conferencing system, such as any of the conferencing systems 102 or 202 discussed above with respect to FIGS. 1 and/or 2.

After start operation 705, method 700 moves to operation 710, where a feature is selected. The feature is any one of the features discussed above with respect to FIG. 3. In some embodiments the feature is a particular word, word choice, phrase, idiom, fill word, grammatically error, pause length, or other speech feature. Decision operation 715 determines whether the selected feature is present in both reference and observed features. Thus, for example, as discussed above with respect to FIG. 3, some embodiments compare observed speech features to reference speech features. If a particular feature, such as a particular word, idiom, grammatical error, fill word, etc., is in the reference or observed speech features, but not present in the other set of features, then the method 700 moves from decision operation 715 to operation 718, which adds a mismatch feature weight to a similarity score or measurement. In some embodiments, each feature is assigned its own weight for the purposes of similarity measurement determination. If the selected feature is present in both the observed features and the reference features, method 700 moves from decision operation 715 to decision operation 720, which determines if the frequency of the feature is equivalent in both the observed and reference feature. Equivalent has various meanings depending on embodiments. In some embodiments, equivalent is defined as within a feature specific range of frequencies. In some embodiments, frequency histograms for features are determined and a best fit between the histograms is determined. For example, a reference word choice histogram is compared to an observed word choice histogram to determine a fit score. The fit score reflects a relative match between the reference and observed features.

If the feature frequencies are not equivalent, method 700 moves from decision operation 720 to operation 725, where a mismatched frequency weight is added to the similarity measurement. In some embodiments, the mismatched frequency weight is proportional to a difference between the two frequencies. In some embodiments, a scaling factor used to compute the mismatch frequency weight is assigned to each feature. Thus, some embodiments can place more weight on differences in frequencies of a first feature than differences in frequencies of a second feature. After any of operation 725, decision operation 720, or operation 718 completes, method 700 moves to decision operation 730, which determines whether additional features are to be evaluated. If so, processing returns to operation 710. Otherwise, the similarity measure determination is complete, and method 700 moves to end operation 750.

FIG. 8 is a hardware block diagram of a computing device 800 that may perform functions associated with operations discussed herein in connection with the techniques depicted in any one or more of FIGS. 1-7. In various embodiments, any of conferencing systems (one or more conference servers) or participant user devices discussed above implement a computing architecture analogous to that described below with respect to the computing device 800.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that are configured for computing device 800. In at least one embodiment, bus 808 is implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, devices, or entities, via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 800 and other systems, devices, or entities to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that are connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 800 serves as a user device as described herein. In some embodiments, the computing device 800 supports a display having touch-screen display capabilities.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, Institute of Electrical and Electronics Engineers (IEEE) 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 8) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided, comprising: establishing a conference session with a plurality of participant user devices; receiving, via the conference session, a digitized audio signal from a participant user device of the plurality of participant user devices; establishing a user account identity associated with the participant user device; determining reference speech mannerism features associated with the user account identity; converting the digitized audio signal to text; generating, based on the text, observed speech mannerism features that are exhibited by the digitized audio signal; determining a similarity measure between the reference speech mannerism features and the observed speech mannerism features; validating an integrity of the digitized audio signal based on the similarity measure; and selectively maintaining the participant user device in the conference session based on the validating.

In another form, an apparatus is provided comprising a network interface configured to enable network communications; one or more processors; and one or more memories storing instructions that when executed configure the one or more processors to perform operations comprising: establishing a conference session with a plurality of participant user devices; receiving, via the conference session, a digitized audio signal from a participant user device of the plurality of participant user devices; establishing a user account identity associated with the participant user device; determining reference speech mannerism features associated with the user account identity; converting the digitized audio signal to text; generating, based on the text, observed speech mannerism features that are exhibited by the digitized audio signal; determining a similarity measure between the reference speech mannerism features and the observed speech mannerism features; validating an integrity of the digitized audio signal based on the similarity measure; and selectively maintaining the participant user device in the conference session based on the validating.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   establishing a conference session with a plurality of participant user devices;
   receiving, via the conference session, a digitized audio signal from a participant user device of the plurality of participant user devices;
   establishing a user account identity associated with the participant user device;
   determining reference speech mannerism features using a plurality of speech classifiers configured to evaluate multiple distinct features of speech mannerisms extracted from of one or more digitized audio signals generated by a particular individual associated with the user account identity;
   converting the digitized audio signal to text;
   generating, based on the text, observed speech mannerism features that are exhibited by the digitized audio signal using the plurality of speech classifiers;
   determining a similarity measure between the reference speech mannerism features and the observed speech mannerism features based on a number of instances and a frequency of occurrence of respective features of the multiple distinct features in the observed speech mannerism features compared to the reference speech mannerism features;
   validating an integrity of the digitized audio signal based on the similarity measure; and
   selectively maintaining the participant user device in the conference session based on the validating,
   wherein determining the similarity measure includes at least:
   identifying a first feature of the multiple distinct features evaluated by the plurality of speech classifiers; and
   applying a mismatch frequency weight to the similarity measure as a scaling factor when the frequency of the first feature in the observed speech mannerism features does not correspond with a frequency of the first feature in the reference speech mannerism features associated with the user account identity.

2. The method of claim 1, wherein the generating of the observed speech mannerism features comprises determining, based on the text, one or more features of speech pauses, grammatical errors, use of idioms, use of phrases, use of filler words, or word choices, wherein the determining of the similarity measure is based on the one or more features.

3. The method of claim 1, further comprising:
   validating the integrity of the digitized audio signal;
   associating, based on the validating, the observed speech mannerism features with the user account identity in a data store; and
   second validating a second integrity of a second digitized audio signal based on the observed speech mannerism features.

4. The method of claim 1, wherein the determining of the similarity measure is provided by a machine learning model.

5. The method of claim 4, wherein the machine learning model is a stochastic classifier.

6. The method of claim 1, further comprising:
   establishing a training session with the participant user device, the training session based on the user account identity;
   generating, over the training session, an audio prompt;
   receiving, over the training session, a training audio signal;
   converting the training audio signal to training text;
   generating, based on the training text, training speech mannerism features exhibited by the training audio signal; and
   associating the training speech mannerism features with the user account identity.

7. The method of claim 1, further comprising validating an integrity of a respective digitized audio signal of each of the plurality of participant user devices.

8. The method of claim 1, wherein determining the similarity measure further comprises at least:
   identifying a second feature of the multiple distinct features evaluated by the plurality of speech classifiers; and
   applying a mismatch feature weight to the similarity measure when a number of instances of the second feature in the observed speech mannerism features does not correspond with a number of instances of the second feature in the reference speech mannerism features associated with the user account identity.

9. An apparatus, comprising:
a network interface configured to enable network communications;
one or more processors; and
one or more memories storing instructions that when executed configure the one or more processors to perform operations comprising:
establishing a conference session with a plurality of participant user devices;
receiving, via the conference session, a digitized audio signal from a participant user device of the plurality of participant user devices;
establishing a user account identity associated with the participant user device;
determining reference speech mannerism features using a plurality of speech classifiers configured to evaluate multiple distinct features of speech mannerisms extracted from of one or more digitized audio signals generated by a particular individual associated with the user account identity;
converting the digitized audio signal to text;
generating, based on the text, observed speech mannerism features that are exhibited by the digitized audio signal using the plurality of speech classifiers;
determining a similarity measure between the reference speech mannerism features and the observed speech mannerism features based on a number of instances and a frequency of occurrence of respective features of the multiple distinct features in the observed speech mannerism features compared to the reference speech mannerism features;
validating an integrity of the digitized audio signal based on the similarity measure; and
selectively maintaining the participant user device in the conference session based on the validating,
wherein determining the similarity measure includes at least:
identifying a first feature of the multiple distinct features evaluated by the plurality of speech classifiers; and
applying a mismatch frequency weight to the similarity measure as a scaling factor when the frequency of the first feature in the observed speech mannerism features does not correspond with a frequency of the first feature in the reference speech mannerism features associated with the user account identity.

10. The apparatus of claim 9, wherein the generating of the observed speech mannerism features comprises determining, based on the text, one or more features of speech pauses, grammatical errors, use of idioms, use of phrases, use of filler words, or word choices, wherein the determining of the similarity measure is based on the one or more features.

11. The apparatus of claim 9, the operations further comprising:
validating the integrity of the digitized audio signal;
associating, based on the validating, the observed speech mannerism features with the user account identity in a data store; and
second validating a second integrity of a second digitized audio signal based on the observed speech mannerism features.

12. The apparatus of claim 9, wherein the determining of the similarity measure is provided by a machine learning model.

13. The apparatus of claim 12, wherein the machine learning model is a stochastic classifier.

14. The apparatus of claim 9, the operations further comprising:
establishing a training session with the participant user device, the training session based on the user account identity;
generating, over the training session, an audio prompt;
receiving, over the training session, a training audio signal;
converting the training audio signal to training text;
generating, based on the training text, training speech mannerism features exhibited by the training audio signal; and
associating the training speech mannerism features with the user account identity.

15. The apparatus of claim 9, the operations further comprising validating an integrity of a respective digitized audio signal of each of the plurality of participant user devices.

16. A non-transitory computer readable storage medium comprising instructions that when executed configure one or more processors to perform operations comprising:
establishing a conference session with a plurality of participant user devices;
receiving, via the conference session, a digitized audio signal from a participant user device of the plurality of participant user devices;
establishing a user account identity associated with the participant user device;
determining reference speech mannerism features using a plurality of speech classifiers configured to evaluate multiple distinct features of speech mannerisms extracted from of one or more digitized audio signals generated by a particular individual associated with the user account identity;
converting the digitized audio signal to text;
generating, based on the text, observed speech mannerism features that are exhibited by the digitized audio signal using the plurality of speech classifiers;
determining a similarity measure between the reference speech mannerism features and the observed speech mannerism features based on a number of instances and a frequency of occurrence of respective features of the multiple distinct features in the observed speech mannerism features compared to the reference speech mannerism features;
validating an integrity of the digitized audio signal based on the similarity measure; and
selectively maintaining the participant user device in the conference session based on the validating,
wherein determining the similarity measure comprises at least:
identifying a first feature of the multiple distinct features evaluated by the plurality of speech classifiers; and
applying a mismatch frequency weight to the similarity measure as a scaling factor when the frequency of the first feature in the observed speech mannerism features does not correspond with a frequency of the first feature in the reference speech mannerism features associated with the user account identity.

17. The non-transitory computer readable storage medium of claim 16, wherein the generating of the observed speech mannerism features comprises determining, based on the text, one or more features of speech pauses, grammatical errors, use of idioms, use of phrases, use of filler words, or word choices, wherein the determining of the similarity measure is based on the one or more features.

18. The non-transitory computer readable storage medium of claim 16, the operations further comprising:
- validating the integrity of the digitized audio signal;
- associating, based on the validating, the observed speech mannerism features with the user account identity in a data store; and
- second validating a second integrity of a second digitized audio signal based on the observed speech mannerism features.

19. The non-transitory computer readable storage medium of claim 16, wherein the determining of the similarity measure is provided by a machine learning model.

20. The non-transitory computer readable storage medium of claim 19, wherein the machine learning model is a stochastic classifier.

21. The non-transitory computer readable storage medium of claim 16, the operations further comprising:
- establishing a training session with the participant user device, the training session based on the user account identity;
- generating, over the training session, an audio prompt;
- receiving, over the training session, a training audio signal;
- converting the training audio signal to training text;
- generating, based on the training text, training speech mannerism features exhibited by the training audio signal; and
- associating the training speech mannerism features with the user account identity.

* * * * *